United States Patent [19]

Willis

[11] 4,153,003

[45] May 8, 1979

[54] FILTER CONDITION INDICATOR

[75] Inventor: William M. Willis, 19440 Citronia St., Northridge, Calif. 91324

[73] Assignees: Wm. M. & Isabel Willis; John W. & Dolores C. Adams; Edward T. & Charlotte L. Bradbury; Robert A. & Dorthy J. Lefevre; Carl L. & Colene Seeley; Gilbert & Dolores D. Contreras

[21] Appl. No.: 528,338

[22] Filed: Nov. 29, 1974

Related U.S. Application Data

[63] Continuation-in-part of Ser. No. 462,968, Apr. 22, 1974, abandoned.

[51] Int. Cl.² .............................................. G01L 7/16
[52] U.S. Cl. .............................. 116/268; 55/DIG. 34; 55/274; 116/DIG. 25
[58] Field of Search ............... 116/DIG. 42, DIG. 25, 116/117 R, 114 PV; 210/90; 73/38, 407, 419; 55/274

[56] References Cited

U.S. PATENT DOCUMENTS

| 2,979,021 | 4/1961 | Scavuzzo | 116/117 R |
|---|---|---|---|
| 3,034,357 | 5/1962 | Brown | 73/419 X |
| 3,125,062 | 3/1964 | Raupp et al. | 116/117 R X |
| 3,146,757 | 9/1964 | Heymann et al. | 210/90 X |
| 3,154,049 | 10/1964 | Smith et al. | 116/117 R X |
| 3,182,630 | 5/1965 | Claeys | 116/114 PV |
| 3,288,101 | 11/1966 | Miller et al. | 116/70 X |
| 3,362,227 | 1/1968 | Reed | 73/407 R |
| 3,413,951 | 12/1968 | Keil et al. | 210/90 X |
| 3,431,883 | 3/1969 | Kudlaty | 116/114 PV |

Primary Examiner—Daniel M. Yasich
Attorney, Agent, or Firm—Poms, Smith, Lande, Glenny & Rose

[57] ABSTRACT

A pressure differential indicator for indicating a change in a fluid pressure differential across a component in a fluid system, such as an oil filter, has piston means, means for communicating fluid pressures of said system upstream and downstream of said component to opposite sides of said piston means, respectively, and differential means associated with the piston means for normally balancing the resultant forces of said pressure on opposite sides of said piston means at a given predetermined pressure differential across said component whereby said piston means is responsive to an increase or decrease in the pressure differential above or below said predetermined differential pressure to indicate a clean or clogged filter condition. Means are provided for holding the piston means in its last position upon relief of said first and second pressures to indicate the operating filter condition when the system is not operating. In alternative embodiments, the indicator includes "kicker" means to start its motion, is responsive at all times to pressure differential above or below a predetermined value and includes a number of embodiments of adaptors to accommodate its introduction into fluid systems.

23 Claims, 19 Drawing Figures

FILTER CONDITION INDICATOR

REFERENCE TO RELATED APPLICATION

This application is a continuation-in-part of my prior co-pending application Ser. No. 462,968 filed Apr. 22, 1974 and now abandoned, entitled Filter Condition Indicator.

BACKGROUND OF THE INVENTION

This invention pertains to a device for determining the cleanliness of a filter or the like. More in particular, the invention is directed to means to determine when a filter of a pressurized fluid system is so clogged with dirt that the clogged filter might harm the system, by starvation for example.

Filters are commonly utilized in many pressurized fluid systems wherein the fluid circulates between a point of use and a sump, a pump, and similarly processing equipment. The purpose of the filter, as is known, is to keep the fluid clean in order to protect the point of use. Such systems are commonly encountered in internal combustion engines as are found in automobiles and large trucks and off-the-road vehicles, stationary installations, and the like. The invention is useful also in systems other than where the circulating liquid is a lubricating oil, much as a system using gases, air filters, filters for water as are used in swimming pools and liquid fuel systems for vehicles and stationary installations, and prime movers generally; hydraulic systems of all kinds, such as earth moving, industrial and aircraft equipment; air systems of all kinds, positive and negative pressure, vacuum pumps and turbines for example; and all sorts of liquid processing systems that include filtration, such as beverage, food and chemical machinery.

Since at least as early as 1962, in military specification MIL-F-8815, the need for devices to measure the amount of dirt in a filter has been known and in use on military and commercial aircraft hydraulic systems, on the filters in such systems. Such hydraulic system filter indicators operate at relatively high pressure and are quite expensive, which is acceptable in aircraft use, but not for general low pressure internal combustion engine use.

Filter capacity in general use is wasted to a large extent, and it is this problem which is alleviated by the invention. That is, in automotive use, it is a common maintenance and service practive to replace the filter in a lubricating oil system at every 4000 or 5000 miles or so, without regard to the condition of the filter. The motorist is alerted to change the filter more often if he drives in "exceptionally dusty" or the like conditions. These manufacturers' recommendations are a best compromise for it was heretofore impractical to measure directly the condition of the filter and consequently it was replaced more often than was necessary, rather than risk possible damage due to a dirty filter.

Similar thinking applies to large trucks, and other such equipment in which the filters were changed even more frequently because a breakdown or a failure of the filter and the concurrent entry of dirt into the engine could prove extremely costly if engine damage resulted. Thus, much filter capacity was and is wasted as a form of engine "insurance."

Even more importantly, this changing of the filter is almost invariably accompanied by a change of the lubricating oil. In the case of an automobile this can be anywhere from 4 to 6 quarts, but in the case of a large truck the amount of oil wasted could run 6 to 12 gallons. In large fleets and from an environmental protection point of view, this is a large problem indeed.

Filtering systems generally fall into two types; those known as full flow wherein all the fluid at all times passes through the filter element, and those which include some sort of partial by-pass around the filter. Both types often include a suitable relief valve whereby unfiltered fluid is delivered to the point of use in the event the filter clogs with dirt. The invention is equally applicable to both general classes of filtering systems.

Thus the addition of the invention device in a pressurized filtered fluid system permits both maximum use of the filter capacity of the filter, as well as maximum use of the circulative fluid. That is, the circulating fluid and filter are not removed from the system and replaced with much of its useful life and filter capacity unused, simply because it is now the proper time to do so, as has been prior practice, but it is only removed and replaced when the invention indicates that the filter is in fact clogged and it is now precisely the right time to replace the filter and the circulation fluid.

Prior filter condition indicators suffer from a large number of problems, all of which are overcome by the present invention. Many such devices required a temperature correction. This was so because the filter would always "seem" to be dirty when starting up full of a cold viscous oil. That is, at relatively low temperatures such as freezing and below, the oil in internal combustion engines is very dense, and would give a false indication that the filter was clogged. Therefore, some correction for temperature had to be made. In the present invention, no such temperature correction is required.

Another problem in prior filter condition indicators is that they often included fairly complex mechanical interconnections which served various purposes. One of the more important purposes was to provide a snap action and lock into the indicated dirty position. This was required so that when the system is shut down, the indicator would still indicate a dirty condition. If there were no such lock, upon de-pressurization, the filter would become depressurized and the indicator would return to an indicated clean position. Such inter-locks and snap action devices suffered from many disadvantages including the fact that they were relatively complex, they required assembly time, they included spring members which were subject to fatigue and unreliability, they invariably required a manual reset, and the like and the other usual disadvantages of mechanical devices. It is essential that a filter condition indicator, including the invention, remain in the last indicated position when the system is shut down because maintenance checks are almost always made when the vehicle is at rest, such as in a garage, rather than when it is working, such as rolling down a highway. The invention accomplishes the desideratum of holding the last indicated position after shut down with no mechanical inter-connection or interlocks or the like, but in a highly simple technically elegant manner.

Another problem with prior devices was the need to accommodate pressure surges without indicating a dirty condition. That is, if for various reasons the filter should experience a surge in pressure, this could be misinterpreted by the indicator device as a filter clogged condition thereby triggering the dirty signal which would in turn be locked into that position. Thus, some accommodation had to be made to differentiate a pressure surge from a true filter dirty condition. The mentioned device accommodates this problem very easily and well.

Another problem with all prior mechanical devices which include springs is that they cannot be fully responsive to a changing system pressure because a spring can exert a fixed force only. The invention indicator self-compensates for varying system pressures by constantly sending the true pressure on both sides of the filter. In automotive lubricating systems the pressure on the oil system can vary between 10 psi and 65 psi between idle speed and cruising speed. The invention device has a built-in pressure differential operating characteristic wherein the differential balance pressure is a predetermined linear ratio of the operating pressure rather than a fixed differential as in a spring biased device. A spring type device with its fixed spring force to set the indicating pressure or the pressure force differential cannot properly accommodate such changing system pressures and flows. Changes in flow rate have no effect on the invention as it is based on system pressure.

SUMMARY OF THE INVENTION

Generally stated, the present invention in pressure fluid indicator for use in indicating a change in a fluid pressure differential across a component in a fluid system, such as a filter, includes the provision of piston means within a housing including means for communicating fluid pressures of the system upstream and downstream of the component to opposite sides of the piston means, respectively, and differential means associated with the piston means for normally balancing the resultant forces of said pressures on opposite sides of the piston means for a given predetermined pressure differential across the component, whereby the piston means is responsive to an increase or decrease in the pressure differential above or below said predetermined differential, which unbalance said resultant forces on said piston means, to indicate either a normal operating or fluid restricting condition for the component, such as a clogged filter. In some embodiments of the indicator, the piston means comprises two separate piston members having first and second pressure surfaces of different size for balancing the differential forces of the device at a predetermined setting desired. In other embodiments, interconnecting means between the piston members provide for a mechanical advantage to one piston member relative to the other in order to balance the differential pressures resultant forces at the predetermined setting desired. Means are also provided, in accordance with the present invention, for holding the piston means in its last position upon relief of the first and second pressures, to indicate the clean or clogged condition of the component, such as an oil filter, even when the system is not operating. In addition, means may be provided, in accordance with the present invention, for holding the piston means in such last position until normal operating pressures for the system are again achieved in order to avoid a false indication during abnormal operating conditions.

The basic underlying concept of the operation of the invention is to tie the filter condition indicator directly to the pressure drop across the filter. That is, when a filter is relatively clean it will have virtually no pressure drop across it. On the other hand, as it is used and clogs with dirt, the pressure drop will increase. In automotive use pressure drops of between 7 and 9 pounds are customarily used and are fairly standard to correspond to a clogged filter. In large trucks a pressure drop of about 10 to 22 pounds is ordinary. The invention indicator is built with an inherent balance at some predetermined difference in pressure between the inlet and outlet sides of the filter, commonly called a delta P. Thus, the invention indicator, in its first exemplary embodiment herein, will always respond to this delta P to indicate a dirty or clean condition, even responding when the condition is false, as in cold starting or pressure surges or the like. The critical difference is that as soon as normal conditions are achieved, i.e., the oil comes up to temperature or the pressure surge subsides, then the indicator will again change state to show the proper condition, be it clean or dirty. In another form of the within invention, the indicator is not responsive to system pressures below normal operating system pressure and includes means for providing a holding force to maintain the indicator in its last indicated position until normal system pressure is achieved.

Thus, in summary, the invention operates by being constantly fully responsive to the true delta P across the filter (alternatively only above less than normal system pressure) and also provides means to respond to any selected predetermined change in pressure, depending upon application and environment.

Since the invention indicator is so responsive, means are provided in the form of friction means to affirmatively hold the indicator at the last indicated position. That is, once indicated in either direction, clean or dirty, the indicator will remain that way due to the friction means until the system change in pressure across the filter is such as to trigger it in the opposite direction.

Also, the invention provides a kicker means to reduce the the initial pressure required to move the indicator in order to make it more responsive, and in order to overcome the friction hold back force. Thus, the friction means and the kicker means operate together, the one to hold back the movement of the indicator, and the kicker to overcome the effect of the friction means when a change in state of the indicator is desired, and at no other time.

The invention has two primary embodiments, and has been designed for use with two different adapting means for use with two broad classes of filters. The embodiments as will be described below, are the in line, and the tandem, and each is usable with either of the two types of filter adapters, the so-called spin-on which is the common automotive type, and the so-called lube-finer, which is a bypass type used in large trucks and the like. Thus, either embodiment of the invention indicator can be used with either adaptor for any kind of filter.

The invention devices are located in a shunt position rather than in the main flow, and the two sides of the invention are separated as to fluids. Thus, there is no possibility of dirt migration into the system due to the invention indicator. In prior art flow through types of indicators dirt contamination of both the system and the device are continuous problems.

Thus, there is provided a filter condition indicator of the character described, which is foolproof, highly efficient, economical to manufacture, easy to install, highly reliable and long-lived, having many advantages over the prior art, and yet which is economical, reliable and simple in construction, use and operation.

The above and other advantages of the invention will be pointed out or will become evident in the following detailed description and claims, and in the accompanying drawings also forming a part of this disclosure, which will now be briefly described.

Figure 1:
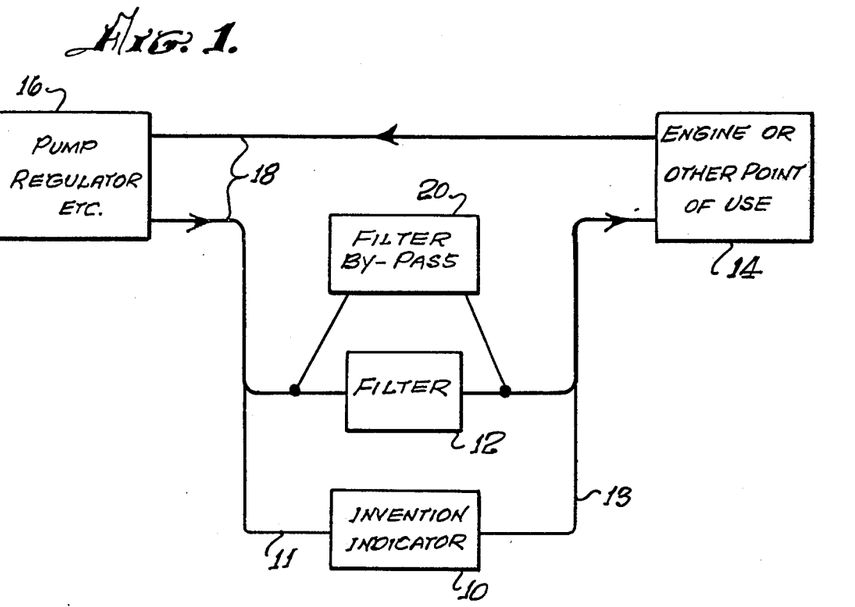
FIG. 1 is a generalized schematic diagram of a system with which the present invention in filter condition indicator may be used.

DETAILED DESCRIPTION OF THE PREFERRED EXEMPLARY EMBODIMENTS:

Referring now in detail to FIG. 1, the system with which the invention is used comprises a filter 12, and an engine or any other point of utilization 14, and the various other pieces of equipment which services the system, which commonly includes a pump, a regulator, a tank or sump, temperature control means, and the like, all indicated by the block 16. These three elements, 12, 14 and 16 are interconnected in a closed loop circuit by conduits or lines 18. The invention indicator 10 is tapped in parallel with the filter 12 into the system by a pair of lines 11 and 13. Such a system will also commonly include a by-pass device 20 which is connected with the circuit in parallel with the filter 12, just as is the invention indicator 10. From the above, it can be seen that the invention is extremely broad in its potential scope of application. Any sort of circulating pressurized fluid system which includes a filter is a possible candidate for improvement by the invention. Such systems would include the lubricating oil systems of all kinds of engines, swimming pools, vacuum systems such as the air system of internal combustion engines and the like as set forth above.

The by-pass 20 will be such as to match the remaining system, but commonly it will be a relief valve which is spring loaded to provide an alternate path for the circulating fluid when the filter becomes filled with dirt and blocked. The spring load will be such as to provide this alternate path at and above a certain pre-determined pressure on the supply side, and will serve, of course, to protect the point of use 14, from starvation.

Systems such as those shown in FIG. 1, can thus be in various different forms and all are well known to those skilled in the various arts in which such systems might be found.

The important consideration with regard to the invention indicator 10 is that at a certain pressure drop across the filter 12, the filter will be no longer properly operative and will require replacement. That is, at some point, the filter clogs with dirt and must be replaced, and it is the goal of the invention to accurately determine this point, thereby not wasting any unused filter capacity, and not wasting any circulating fluid by prematurely replacing the fluid.

The invention is not limited to use with filters to detect the pressure drop there across, but may be used in any environment whereas it is desired to give a physical indication of a predetermined difference between two pressures. For example, it may be that a complex system, as in a refinery for example, may have two pressurized lines in a single installation, and it may be that these two lines must always be pressurized within a predetermined number of pounds of each other. The invention lends itself ideally to such a case, in that, referring to FIG. 1 the lines 11 and 13 would be brought to these two locations on the unit, and the invention indicator would always indicate whether the predetermined difference would be more or less. In such cases, instead of dirty and clean, the indicia on the buttons might be "safe" and "unsafe" or simply red and green. Similarly, the invention could be used to indicate when a single pressure exceeds or is less than a predetermined reference pressure. In such case one of the lines 11 or 13 would be brought to some reference pressure, and the other line 11 or 13 would be brought to the parameter being monitored, the invention being used to indicate whether the pressure being checked is more or less than the reference pressure plus or minus the predetermined pressure differential built into the invention device.

Thus, in summary, the invention can be used whenever it is required to give an indication of one pressure exceeding or being less than another pressure by an amount greater than or less than, respectively, a predetermined amount, with the predetermined pressure differential being built into the invention device.

Stated another way, the invention can be thought of as monitoring the pressure differential itself. In such case, the indicator will be in one indicated position so long as the differential is less than the predetermined invention device amount, and in the opposite indication when the differential exceeds the predetermined amount.

Figure 2:
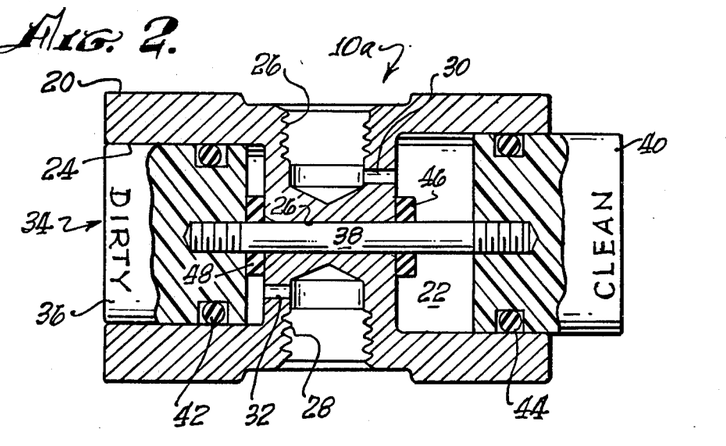
FIG. 2 is a cross sectional view through a first embodiment of the present invention in filter condition indicator.

Referring now to FIG. 2, a first embodiment 10a is shown in detail, this FIG. 2 form of the invention is the simplest in concept, is the first form developed, is shown at this point in order to serve as the basis for the explanation of the concepts of the operation of the invention. The preferred form of the invention is shown later in FIGS. 12 through 19.

Device 10a comprises a body 20 which is of generally cylindrical shape, appearing in a longitudinal cross-section view of FIG. 2. Body 20 is formed with a pair of blind end bores 22 and 24, extending towards each other from the opposite ends of the body. The bores 22 and 24 are of substantially the same axial length, but the bore 22 is of a pre-determined larger diameter than the bore 24, for reason which will appear below. The bores are interconnected by a relatively small diameter inter-connecting passageway 26. Means are provided to connect the outsides of the bores 22 and 24 to the lines 11 and 13. To this end body 22 is formed with a pair of tapped openings 26 and 28, each of which cooperates with a short communicating passageway 30 and 32 respectively, whereby the insides of the bores are tapped into the system of FIG. 1. Tapped openings are shown at 26 and 28 by way of example only, other connection means could be used in other environments, such as pressure fitting in a hydraulic system, jam nuts in a water system, or the like.

Embodiment 10a further comprises a moving indicator button assembly 34 which comprises a dirty end button 36, an interconnecting rod 38, and a clean end button 40. Buttons 36 and 40 are slidingly and sealingly received in the bores 24 and 22 respectively, and each is held in sealing relation therein by suitable O rings 42 and 44 respectively seated in suitably formed grooves in the sides of the respective buttons. The overall length of the assembly 34 is greater than the overall length of the body 20 so that one end of one of the buttons 36 or 40 will always be extending out from the body thereby indicating the filter condition. The words "clean" and "dirty" are provided on the buttons 40 and 36 respectively, so that a quick visual inspection indicates the filter condition.

Washers of relatively hard rubber 46 and 48 are provided in the bottom of each of the bores 22 and 24, and is cemented therein at the locations shown surrounding the opening 26. The washers shall be called the "kickers" of the invention for reasons which will appear below. They are of a predetermined diameter with respect to the diameter of the bore in which they are seated. As an incidental matter, each kicker 46 and 48 serves a secondary function of providing a fluid seal around the rod 38 in the passage through the washer. The rod 38 is held into the buttons 36 and 40, by a threaded connection or by any other suitable means.

Another advantage of the kicker is that it also works in reverse. That is, once the device does snap over, the kicker on the other side holds the indicator over by reducing the surface area on that other side. Thus strong pressures, and marginal differential pressures will not cause "chatter" or erroneously kick the device over again.

In use, the dirty button via the tapped hole 28 is connected to the upsteam or high pressure side of the system, and the other hole 26 and the button 40 is exposed to the system after the filter. From elementary physics, the force acting on either button 40 will be the product of the pressure times the cross-sectional area of the button exposed to the pressure. Button 40 is a pre-determined amount larger than the button 36, and this predetermined amount is made proportional to the predetermined permissible pressure drop across the filter. Thus, as the filter clogs and produces an upstream pressure larger than the predetermined permitted amount, the pressure in the passageway 32 on the button 36 will gradually increase to an amount larger than the pressure on the clean button and larger than this pressure plus the predetermined pressure drop, when the filter reaches this condition, and the pressure so increases, the member 36 will move rapidly to the other side, thereby exposing the "dirty" indicia showing that the filter is full.

Thus it can be seen, that the predetermined pressure differential can be built into an embodiment of the invention apparatus in at least two different ways. The simplest more straightforward, at least conceptually, way would be that of FIG. 2, wherein one of the pistons is simply made of a larger cross sectional area than the other, and by an amount proportional to the desired pressure differential, with respect to the operative pressure anticipated.

Figure 3:
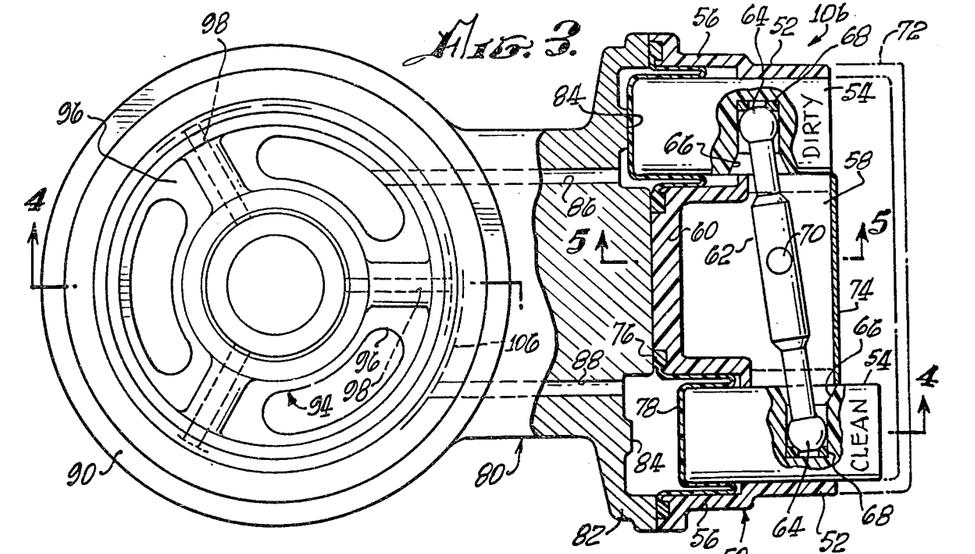
FIG. 3 is a plan view of a second embodiment of the filter condition indicator shown together with a first form of adapter with some parts broken away and in cross section for the sake of clarity.

The second manner of providing the desired pressure differential is that of the tandem embodiments such as FIG. 3. In this case the two pistons have the same cross sectional area, and a larger operating force is built into one or the other of the two identical pistons by changing the movement arm by moving the location of the pivot pin 70 on the interconnecting rod or other interconnecting means 62.

I have also found that it is possible and perhaps preferable to make one piston in the FIG. 3 type of embodiment, a little bit larger than the other. In this manner the pivot point can be closer to the centerline of the device which makes a better appearance. i.e. the two buttons extend out from the device more closely equal amounts. The pivot can be moved to either side of the centerline depending upon overall conditions. This slight variation of the FIG. 2 embodiment does not detract from its overall versatility, and in fact could be thought of as adding to that versatility.

Thus, the term "differential means" as used in the specification and claims wherein, shall be understood to mean any such means, such as the difference in cross-sectional areas of the pistons, or the difference in length of lever arm of interconnected pistons due to the location of the pivot of the interconnecting rod, which builds into an embodiment of the invention the requirement that the difference force to move the assembly pistons and interconnecting means be larger on one side than on the other side, and that the difference between such forces, the "differential force," be a predetermined known amount corresponding to that produced on the pistons by the, and differential pressure across the component sought to be measured.

The "difference force" may be chosen to correspond to the pressure drop expected across a dirty filter in an automotive lubricating system such that the "differential means" will not respond to normal changes in pressure across the filter due to changes in system pressure when the filter is clean, but will act independently thereof in responding to only the chosen "difference force" indicating a dirty filter condition.

It is an important advantage that the invention will not "chatter" in its motion, but rather will move with a snap action. This effect is caused by kickers 46 and 48.

These washers serve to prevent the bottom of the buttons from coming down flush against the bottom of their respective bores, and also serve, most importantly, to slightly diminish the cross-sectional area exposed to the particular pressure in the passageway 30 or 32. That is, the kickers in effect "cheat" the predetermined force needed to activate the invention device by a tiny amount proportional to the linear surface area of the washer itself. In this manner the device will move more easily, and once it moves even the slightest little amount, immediately the full surface area is exposed to the pressure whereby the force is immediately increased to the full amount.

Another advantage of the kickers is that they help to overcome the frictional force provided by the O rings 42 and 44. These O rings themselves provide other advantages but they produce this frictional force which must be overcome, as explained above in regard to the kickers. The advantages of the O rings are that they provide a seal, in the usual manner, to prevent leakage of the fluid out of the invention device. Further, they provide a slight frictional holding force which is very important in producing the invention advantage of always holding the last indicated position. That is, when the moveable member is to either side, indicating clean or dirty, and the system in which it is used is shut down, the invention device will remain in that position due to the frictional force of the O rings 42 and 44.

Thus, when an engine is started cold the invention device will immediately indicate dirty because of the viscous lubricating oil, but this condition will automatically correct itself back to an indicated clean position as soon as operating conditions reach normal, and assuming that the filter is not yet expended. A similar response will obtain in the event of a pressure surge, momentarily indicating dirty but quickly returning to the clean position. The FIG. 2 form of the invention may be thought of as an in-line embodiment.

Figure 4:
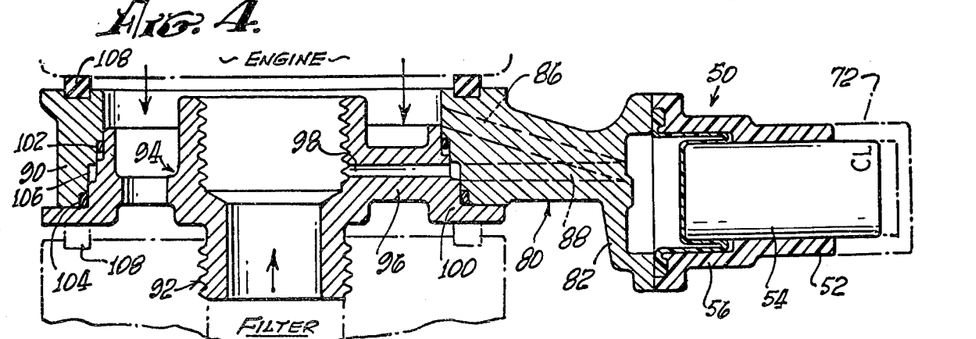
FIG. 4 is a side elevational view of the indicator and adapter of FIG. 3 with some parts broken away and in cross-section.
Figure 5:
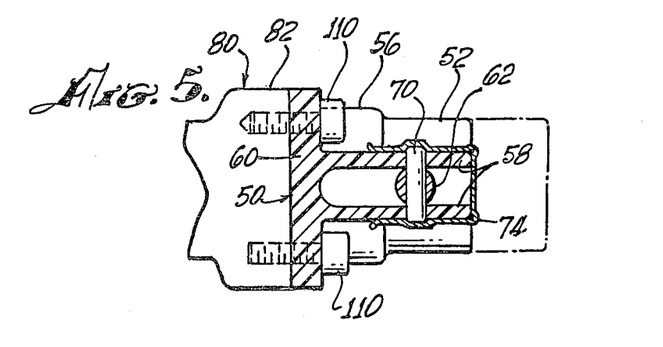
FIG. 5 is a cross-sectional view of a detail taken on line 5—5 of FIG. 3.

Referring now to FIGS. 3, 4 and 5, there is shown a second embodiment of 10b of the invention indicator which may be thought of as a tandem embodiment in that the two buttons are side by side.

Embodiment 10b comprises a body member 50 comprising a pair of tubular portions 52 each of which snugly and slidingly receives an indicator button 54. One button carries the clean indicator and the other button carries the word "dirty" otherwise the two buttons are identical. This fact is different from the embodiment 10a and will be described in more detail below. Below each of the tubular portions 52 body portion 50 comprises an enlarged tubular axially aligned portion 56. The portions 52 and 56 on each side are interconnected by a pair of spaced cross walls 58. The portions 56 and 58 are interconnected at their bottom by a relatively thick bottom wall 60. The two bottoms 54 are operatively interconnected by a cross beam 62 having a ball end 64 at each end which is snugly and rotatingly received in a formed opening 66 in each of the buttons 54. The ball ends 64 rest against resilient washers formed of rubber of a like material 68 seated at the bottom of the formed openings 66. As is clear from the drawing, the shape of the formed opening 66 is such as to snugly receive the ball ends 64, while at the same time providing sufficient clearance to permit their rocking therein as the two buttons alternately go up and down. A pivot pin 70 is provided in suitably formed openings in the pair of cross walls 58 and in the cross beam 62 in order to permit the rocking motion of the beam 62. The location of the axis of this pin 70 on the walls end in the beam 62 is important in obtaining the proper operation of the invention and its advantages as will be brought forth in greater detail below.

A protective cover 72, formed of clear plastic or the like material, is secured to the free ends of the portions 52 and 58 of the body 50 by any suitable means (not shown), for the purpose of protecting the invention indicator from dust and the like. Any sort of other environmental cover could be omitted in the proper situation.

Additionally, the space between the walls 58 is protected against the intrusion of foreign matter which might interfere with the operation of the beam 62, and the pivot pin 70 is held in place by snap-on cover 74. This cover has a top flange which overlaps the space between the walls 58, and a pair of legs extending down downwardly therefrom with formed detents to receive and hold the end of the pivot pin 70. The cover 74 is a conventional sort of device, in concept, and is readily fabricated from eight gauge spring steel or the like metal.

In regard to materials, it should be noted that the entire body 50 as well as the two buttons 54 are formed of plastic material, are fully symmetrical about all planes, and the two buttons may be identical. This is an important manufacturing advantage of this embodiment 10b. The use of plastic materials and injection molding techniques greatly decreases the cost of manufacture of the invention as compared to manufacture in metal. The fit between the buttons 54 and the tubular portions 52 is satisfactory despite the plastic to plastic contact, because this is strictly a guiding function, the seal being provided at the adapter, as will appear below. The use of buttons of the identical size, and configuration, except for indicia, again greatly decreases cost of manufacture and simplifies production and assembly. Only one size button need be stocked. Of course, one button would be slightly larger than the other while still returning substantially all of these advantages as set forth above.

The full operating characteristics and advantages are preserved, as will be explained below. Bottom wall 60 is formed with a circular groove surrounding each of the enlarged bottom tubular portions 56. The head 76 of a diaphragm member 78 is snugly received within this groove. The diaphragm 78 is of circular configuration and of large diameter to provide a doubled over return portion in the annulus between the lower end of the button 54 and the inside of the tubular portion 56. Thus, the button is free to move in its relatively loose fit or relatively not sealed fit in the portion 52, the seal being provided by the diaphragm 78 in the portion below.

Means are provided to hold the diaphragm heads 76 in their grooves and to provide some means equivalent to the kickers 56 to provide that function, and further to interconnect the indicator 10b with some pressurized flow to detect filter condition. To this end, an adapter member 80 is provided and comprises a plate portion 82 which bears against the bottom wall 60 of the body 50. This plate portion serves to hold the head 76 of the two diaphragms together in their grooves to maintain a sealing relationship between the body 50 and the adapter 80. The plate portion 82 is formed with a pair of cavities which line up with the tubular portions 56 to form part of the combined passageway for movement of the indicator buttons 54 therein. The bottom of each of these cavities in the adapter is formed boss 84 which serves the function of the washers 46 and 48 of the previous embodiments.

Beyond the plate portion 82, adapter member 80 comprises a throat portion which is formed by a pair of passageways 86 and 88 which communicate one with each of the spaces under the two diaphragms 78 in the body 50 of the indicator 10b. These two passageways 86 and 88 are functionally identical to the two lines 11 and 13 of FIG. 1, that is, they serve to connect the indicator 10b to the filter. Beyond the passageways 86 and 88, the adapter 80 comprises a ring portion 90 which encloses the adapter member 92. Adapter member 92 fits between the filter and engine and it reproduces the engine connection for the filter, and the filter connection for the engine. To this end, the member comprises a central portion 94 having female threads at one side for connection to the engine, and have male threads at the opposite side for connection to the filter in the ordinary manner as indicated schematically in the drawing. The structural portion 94 is supported on three strut members 96 each of which is formed with a fluid passageway 98, which taps into the central through opening through the central portion 94. The adapter 92 is completed by an outer ring and ledge member 100 which is supported on the outer ends of the three struts 96. As in conventional, the flow of lubricating oil is from the engine through the outside of the adapter member over the struts and between the openings there between, (see FIG. 3) through the filter, and thence returning through the opening in the central portion to the engine. The passageway 86 in the throat portion communicates directly with the internal flow from engine to filter.

Means are provided to communicate the passageway 88 with the internal flow through the central opening in the central portion 90. To this end, the inside surface of the ring portion 90 is formed with three concentric increasing diameter ledge portions and the outside surface of the ring and ledge portion 100 of the adapter member 92 is formed with three similar concentric ledges which contract with the ledges on the portion, in the manner shown in FIG. 4. The innermost pair of ledges on these two members form a seal in which an O ring 102 is seated, and the outermost two ledges form a space which is sealed by an O ring 104, thus the midele two walls form a space 106 which surrounds the entire adapter member 92. This space communicates with both the three passageways 98 in the struts 96 and also with the passageway 88 in the throat member. Thus communication is assured from the appropriate button, clean indicator, to the return flow from the filter to the engine.

An advantage of the adapter of the invention is that it is useful with conventional filter seals 108, one provided in a suitable groove in the upper surface of the ring in a suitable groove in the upper surface of the ring portion 90 for cooperation with engine (just as if the filter were there), and a second one at the bottom surface of the ring and ledge portion 100 for cooperation with the filter (just as of the engine were there). In this manner, the invention uses conventional parts and simplifies its actual practice in the field.

The whole adapter 92 is free to rotate within the ring 90, which is an advantage in that it permits the device to be located in the best position for viewing.

The indicator 10b may be held on to the adapter 80 by any suitable means such as the screws 110 shown in FIG. 5, or external clips, or by smaller screws located inside the groove between the pair of cross walls 58, or in any other suitable manner.

It can now be appreciated how the tandem embodiment 10b is structurally different and yet functionally identical to the in-line embodiment of 10a of FIG. 2. Preparing the drawings, the bosses 84 serve the function of the washers 46 and 48, the metal to non-metal contact surface being reversed but nevertheless maintained. The friction which holds the parts in the last indicated position provided by the O rings 42 and 44 of the 10a embodiment, is provided by the two small washers 68 at the ball end 64 of the cross beam 66. The variable delta P or differential pressure at which the device will operate, provided by the difference in diameter of the buttons 36 and 40 of the embodiment 10a, is provided by the variable moment arms in the factory, via location of the pivot pin 70 in the 10b embodiment. That is, when finally assembling a group of indicators for any particular delta P, the factory will have predetermined the location of the pivot 70 to produce a particular differential pressure. The dirty side indicator will usually be given a shorter moment arm than the clean side and the difference in the length of these two moment arms will be directly proportional to the desired differential pressure. It is in fact this versatility which permits a virtual identical indicator to be used for virtually any desired differential pressure by simply moving the location of the pivot pin 70, a very simple factory operation at final assembly.

Figure 6:
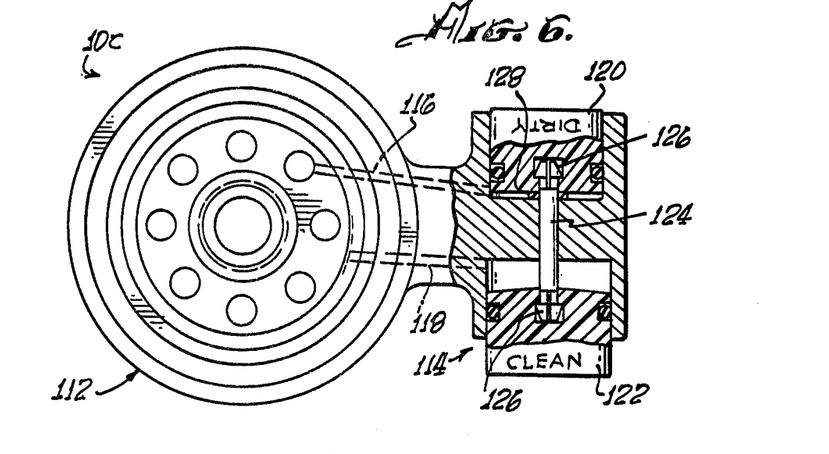
FIG. 6 is a view similar to FIG. 3 showing another embodiment of the invention indicator combined with another embodiment of an adapter.

There is shown a third embodiment 10c which comprises an adapter portion 112 which is connected to an indicator portion 114. A pair of passageways 116 and 118 interconnect the two portions 112 and 114. The adapter portion is functionally identical and structurally very similar to the adapter portion 80 of the embodiment 10b of FIG. 3. The structural difference, primarily, is that a plurality of holes (8 holes) is provided in lieu of the three elongated slots of the 10b embodiment. Otherwise the parts are the same, and thus the description of the adapter need not be repeated.

The indicator portion 114 comprises a dirty button 120, and a clean button 122, which are interconnected by a rod 124. Connection means 126 are provided at each end of the rod 124 to connect to the button. These connection means are in the form of split fingers having an overhanging ledge as shown, which may be thrust through the bottom and into the prepared shouldered opening in the bottom end of the button, whereupon the fingers of the connection means spread apart, their bottom ledges interact with the ledges in the opening, and a firm tight connection is thereby formed. A kicker member 128 is provided for cooperation with the dirty end button 120. No kicker is provided for the clean end button and in lieu thereof the inner end of this button 122 is formed with a tapered surface 130. This surface assures that the pressurized fluid in the passageway 118 will be able to get at least partly under the button, when the button is in the position opposite that shown in the drawing, in order to start the motion of the buttons and rods in the downward or clean indicated position. This indicator position 114 is shown to illustrate a particularly low cost embodiment, one kicker is saved thereby directly saving its cost multiplied by the intervening wholesalers and retailers. It is thought that the invention indicator could, in most applications, operate without a clean side kicker, because when the engine is started up, it should never be beginning in the dirty indicated position unless the engine oil is in fact dirty, in which case the aid in kicking over to indicate clean is not often required. However, in most cases, it will be preferred to have kickers on both sides. The similarity of this indicator portion 114 to the first embodiment 10a of FIG. 2 is readily apparent, and reference may be had to that drawing and the description thereof for parts of the portion 114 not described above.

Figure 7:
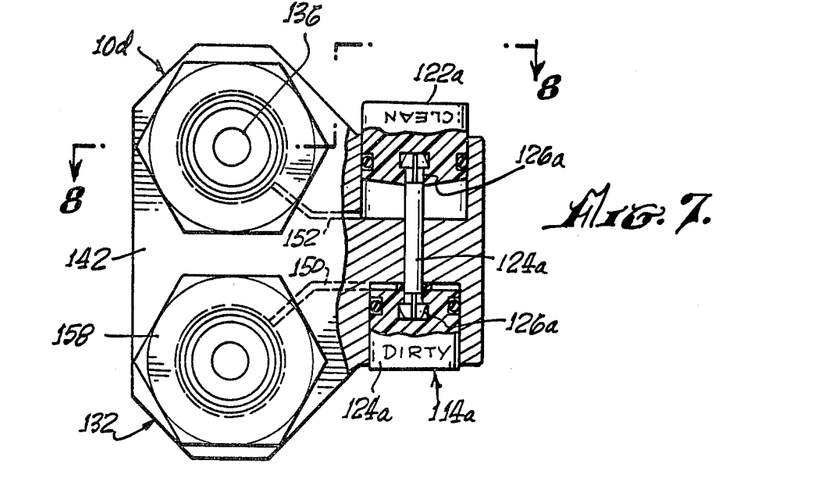
FIG. 7 is a view similar to FIG. 6 showing the same indicator with another adapter.
Figure 8:
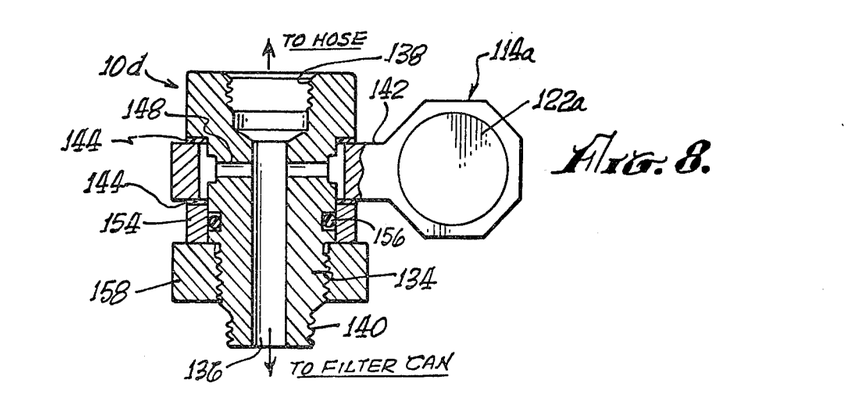
FIG. 8 is a cross-sectional view taken on line 8—8 of FIG. 7 showing the details of the FIG. 7 adapter.

Referring now to FIG. 7 and 8, there is shown another embodiment 10d of the invention adaptable for use with large trucks and heavy machinery having a re-conditioning type of filter on the vehicle or in the installation. Such filters normally accommodate only a partial flow, and often include a large element called the "filter can" in the drawings. For purposes of the invention, it is only required to understand that the filter condition indicator is connected by hoses to some sort of filtering device in some sort of pressurized fluid system.

Embodiment 10d comprises an indicator position 114a, which is identical to the portion 114 described above, with the exception of the difference in the adapter. The adapter portion 132 is described in detail below and is shown best in FIG. 8. The indicator portion has not been described again, but the parts are simply indicated by the same reference numerals used in FIG. 6, followed by "a".

The adapter portion 132 comprises a pair of main members 134 which are formed with a through opening 136. A female connection 138 is provided at one end of the opening 136 for connection to a hose or conduit or the like to carry the fluid to or from the filter, and the opposite end of the opening is formed with male threads or other connection means 140 to connect to a hose or the like to interconnect to the filter can. Thus, by use of the two main members 134, interconnections between the filter can and the rest of the system, via the invention can be made. The adapter body 142 is seated in a suitably formed groove, and a pair or plurality of small passageways 148 interconnect the main passageway, to one or the other of the passageways 150 and 152 (see FIG. 7) to interconnect to the buttons in the indicator portion 114a. A pair of gaskets 114 are provided between the adapter body 142 and the sides of the receiving groove in the main member 134. It should be noted that the bottom of the groove of the member 134 defines a cross sectional area considerably smaller than the opening in the body 142, whereby the two assemblies built on the main member 134 in effect "float" on the adapter body 142. In this manner the connections are flexible and respond to slight inaccuracies in the hoses or other fittings brought to the adapter to be thereto, to thereby lend great flexibility to the invention in use.

A ring 154 is provided on the opposite sides of one of the gaskets 144, and seals tightly on an O ring 156 provided in a suitalbe groove in the main body 134. This seal and all of the other parts are held tightly secured together by means of a standard jam nut 158 provided on suitable threads next to the threaded end 140. Assembly and disassembly is simple and clear from the drawing, the jam nut 58 is simply removed, whereby upon all the parts may be simply taken apart or put together.

Figure 9:
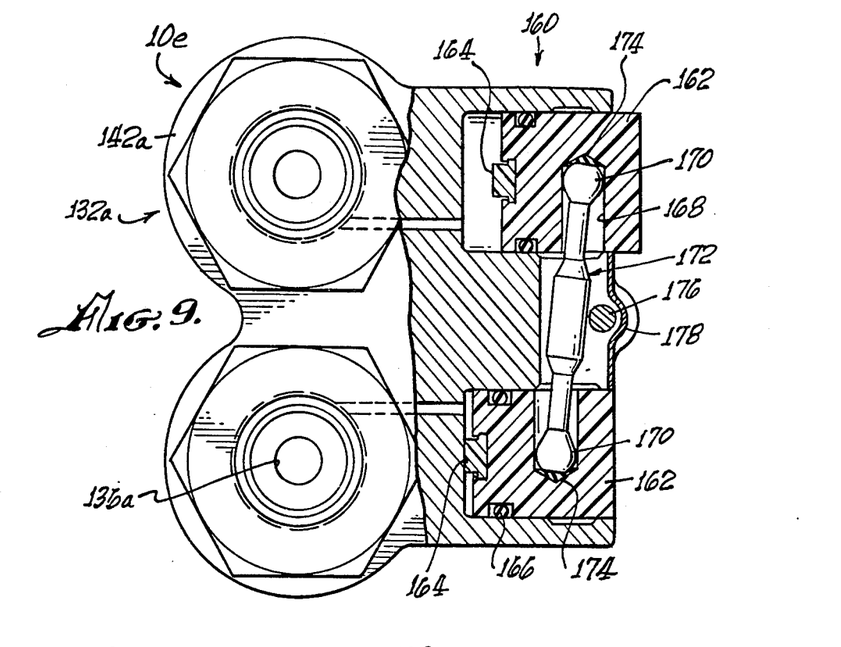
FIG. 9 is a view similar to FIG. 3 showing another embodiment of the invention indicator combined with another adapter.

Referring now to FIG. 9 there is shown another embodiment 10e which is a combination of the adapter portion 132 of FIGS. 7 and 8, combined with an indicator portion 160 which is a modified portion of the preferred embodiment of FIGS. 3 and 4. The adapter portion 132 is functionally and structurally identical to that described above, and thus its description need not be repeated. The adapter body 142a has a slightly different configuration than the body 142 but this is a mere matter of appearance.

The adapter portion 160 is a tandem type utilizing O rings, rather than the diaphragm 78 of embodiment 10b.

Accordingly, indicator portion 160 comprises a pair of buttons 162, which are advantageously identical. Each button is provided with a kicker member 164 at its inner end, and with a sealing O ring 166 seated in a suitable annular groove in the side of the button. Further, each button has a formed opening 168 which receives a ball end 172 of a cross beam 172. Friction means 174, analogous to the resilient washers 68 of the 10b embodiment, are provided in the bottoms of the formed openings 168 for cooperation with the ball ends 170 to hold the parts tightly together, and to hold the last indicated position. The parts are held in assembled position, and a pivot point is provided for the otherwise "free floating" crossbeam 172 by means of a pivot pin 176 mounted in the body 142a. A cover and retainer member 178 is provided to close off the cavity containing the parts 172 and 176, and to provide dust protection. The analogy to the parts 70 and 74 of the 10b embodiment described in greater detail above is manifest.

As is clear, one or the other of the buttons 162 is made the clean or dirty button, and the differential pressure is predetermined and built into the device, by simply selectively locating the axis of the pivot pin 176 within the body 142a. The logic is conceptually identical to that in regard to the location of the pivot pin 70 in the FIG. 10b embodiment as explained in greater detail above.

Figure 10:
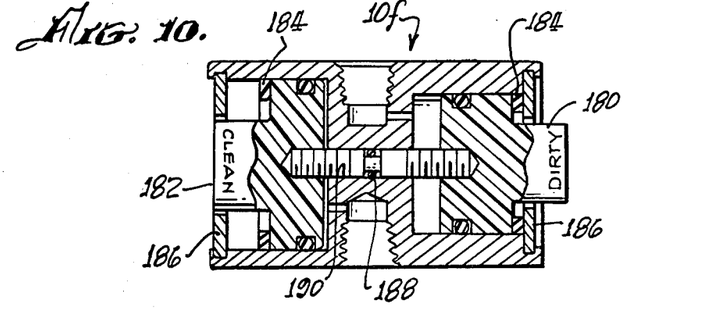
FIG. 10 is a view similar to FIG. 2 showing yet another embodiment of the indicator.

The embodiment 10f of FIG. 10 is shown for the purpose of illustrating use of the invention in a vacuum system. For purposes of illustrating use of the invention in a vacuum system. For purposes of specification and claims herein, vacuum systems shall be understood to mean those in which the operating fluid is at a pressure less than atmospheric or ambient pressure, and in which the invention device is exposed externally to said atmospheric or ambient pressure. The embodiment 10f is essentially an in line form of the invention analogous to embodiment 10a, and reference should be had thereto for detailed explanation of some of the less important parts which have been omitted from the following description.

The buttons 180 and 182 are stepped and each carries a kicker 184 on step shoulder. The ends of the body comprises retainer plates 186 which are held on the outer edges of the body by staking or peening or the like suitable means. A seal in the form of a small O ring or the like, may be provided in the connecting rod 190 between the buttons 180 and 182. It should be noted that the feature of this seal 188 may also be provided in the embodiment 10a, or in any other in line embodiment, if such added security were required for a particularly harsh environment or any other reason. The operation of this embodiment is essentially the same as the 10a embodiment, with the exception that atmospheric pressure is the pressure that throws the device over in a snap manner. When the device "cracks" by moving a small amount, the kicker thereby increases the amount of surface area exposed to atmospheric pressure, thereby rapidly increasing the pressure force tending to operate the invention device, achieves the snap action.

Figure 11:
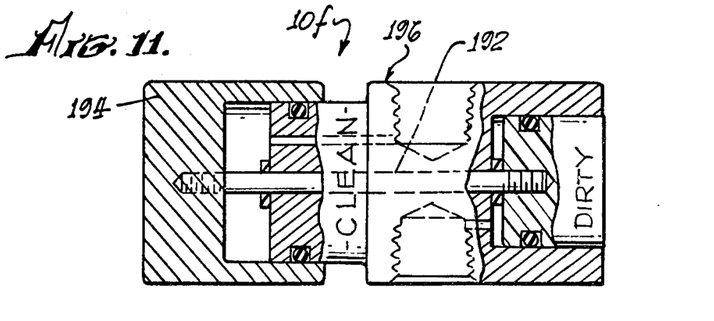
FIG. 11 is a view similar to FIG. 2 showing still another form of the invention indicator.

Referring now to FIG. 11, there is shown another alternative embodiment of the invention at 10g. Embodiment 10g has a particular advantage in that it lends itself to virtually entire fully automatic manufacture with the use of automatic screw machines. It is functionally identical to the basic 10a embodiment again, the following description will confine itself to those parts not already described above.

The rod 192 interconnects a conventional dirty indicating button with a cup like member 194 at the clean end. The legend "clean" is provided on the body of the device itself, and the motion of the cup member acts to reveal this word while concealing the word dirty on the other button, which is drawn into its operating on the bottom end of the body 196.

Figures 12, 13, 15, 16:
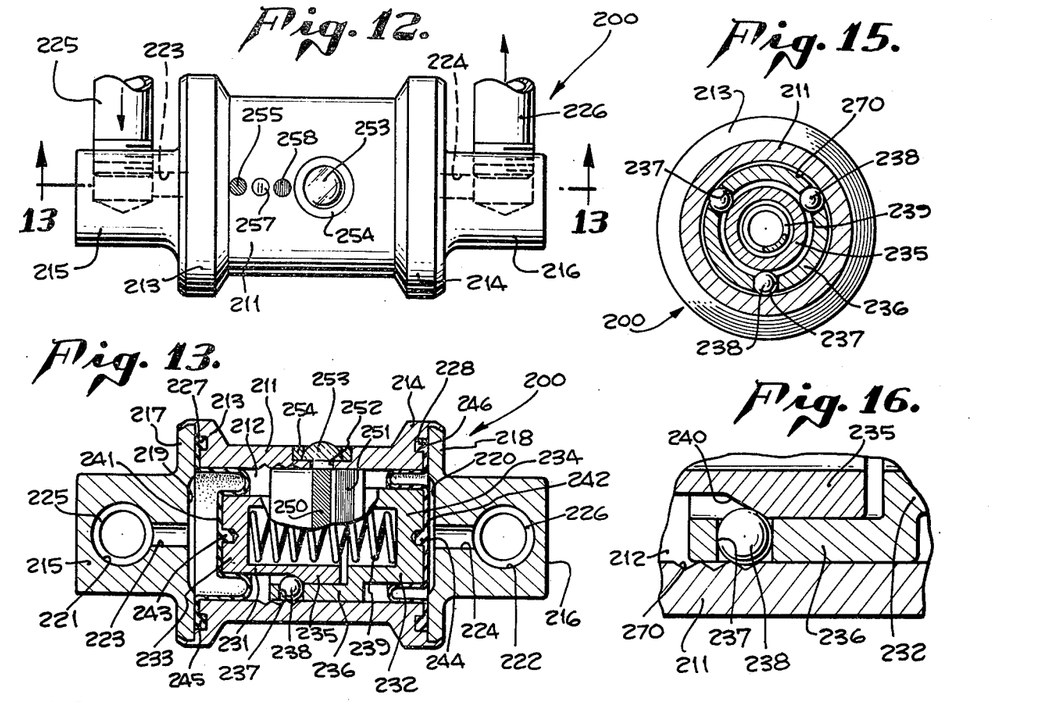
FIG. 12 is an elevational view of still another form of filter condition indicator according to the present invention.
FIG. 13 is a cross sectional view through the embodiment of filter condition indicator of FIG. 12 taken on line 13—13.
FIG. 15 is a section view of the indicator of FIG. 14 taken on line 15—15.
FIG. 16 is a detailed view of the indicator of FIGS. 12-15.

Referring now to FIGS. 12 through 18, a still further alternative exemplary embodiment of pressure differential indicator, according to the present invention, will be described. As seen in FIG. 12, this form of pressure differential indicator, indicated generally at 200, includes a tubular housing 211 defining a cylindrical interior piston chamber 212 and including outwardly flared end flanges 213 and 214. End bells or fitting 215 and 216 are provided for closing the ends of the housing with flange portions 217 and 218, defining cavities 219 and 220, respectively, interfacing with the end flanges 213 and 214 of the housing. The end bells 215 and 216 include fluid communicating bores 221 and 222, respectively, with associated passageways 223 and 224, respectively, extending from the respective bores to the end fitting cavities opening to the interior of the housing as seen in FIGS. 13 through 18. Appropriate conduits 225 and 226 may be provided for interconnecting the indicator, indicated generally at 200, to the upstream and downstream sides of the fluid system, represented by conduits 11 and 13 in FIG. 1, respectively.

Piston means are provided within this alternative exemplary embodiment which comprise an assembly of telescoping piston members including first piston member 231 and second piston member 232. The piston members 231 and 232 each include head portions 233 and 234, respectively, and skirt portions 235 and 236, respectively. As seen in FIGS. 13 through 18, the skirt portion 236 of the second piston member 232 is stepped outwardly of its head portion 234 in order to telescopically surround and receive the skirt portion 235 of the first piston member 231. The effective surface area of the second piston member 232, being exposed to the lower downstream system pressure is larger than the effective pressure surface area of the first piston member, piston member 231, which is exposed to the upstream higher system pressure as disclosed in the foregoing embodiments.

As particularly contemplated within the present invention and as illustrated in the present embodiment, means are provided for maintaining the assembly of piston members 231 and 232 in a last position assumed prior to relief of the system pressures upon the piston members. In the exemplary embodiment, such means comprise the provision of a plurality of slots 237 in skirt 236 with friction members, the balls 238, positioned therein. Three such slots and balls are preferably provided as best seen in FIG. 15. The assembly of piston members 231 and 232 is normally biased to telescope outwardly via coil spring 239. Therefore, when no system pressure is applied to the indicator device through the respective conduits 225 and 226, the piston members 231 and 232 will be forced apart by the spring member and ramp surface 240 on skirt portion 235 will be forced against each of the balls 238, otherwise retained in slots 237, outwardly against the surrounding side walls of the housing chamber 212 to provide a frictional holding of the assembly in its last position prior to relief of such pressure. Referring to the detailed view of FIG. 16, it can be seen that indexing groove means in the form of serrations 270 may be provided in the surrounding side wall 212 to be engaged by one or more of the balls 238 to assist locating and maintaining the assembly in said last position until system pressure is again applied to the indicator.

Figure 17:
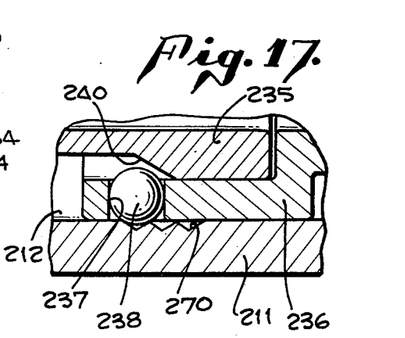
FIG. 17 is a detail view as in FIG. 16 showing the parts in different relationship.

Upon the application of system fluid pressures upon the indicator through the aforedescribed conduits, bores and passageways the piston members 231 and 232 will be forced toward one another against the urging of spring 239. The specifications for spring 239 may be selected in order to provide for immobilizing the piston member assembly until a system pressure of a predetermined value is achieved, thus eliminating false indications from the indicator device otherwise due to movement of the piston members during starting or idling conditions. When a predetermined system pressure is attained, such that the piston members are moved toward one another, the respective friction members, balls 238, are released from under the cam or ramp surface 240 of the inner piston skirt portion 235, as best seen in FIG. 17, to allow the assembly to be moved under the changes thereafter in differential pressure values.

As in the prior embodiments, diaphragm means are provided for directing fluid pressures upon the appropriate piston pressure surfaces of the piston members. A first diaphragm means 241 having a locating nub 243 positioned in a central aperture of the piston head portion 233 has a diaphragm bead 245 sealingly trapped in groove 227 provided in housing flange 213 at the interface between end fitting flange 217 and the housing flange 213. Similarly, a second diaphragm means 242 is positioned adjacent the second piston member 232 with a diaphragm locating nub 244 engaging the piston head portion 234 having a diaphragm bead 246 located in flange groove 228. Such diaphragm means are of appropriate size, as disclosed hereinbefore to facilitate axial movement of the assembly of piston members within the housing under the influence of the system fluid pressures introduced to either end of the housing.

Figure 18:
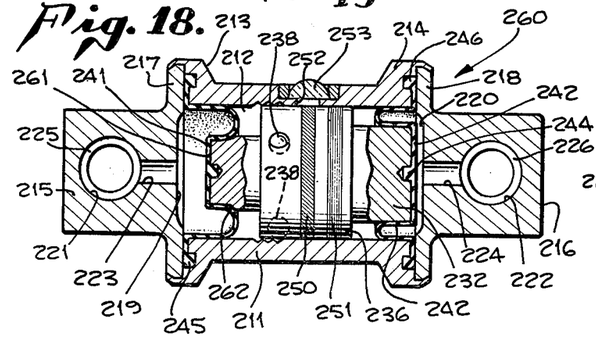
FIG. 18 is a view similar to FIGS. 13 and 14 showing the piston means in a "filter clogged" condition.

Indicia, indicated generally at 250 in FIG. 18, are provided upon the outer piston skirt portion 236 in order to indicate the positioning of the piston assembly under the influence of system pressures exerted thereon. As seen in FIG. 18, such indicia may comprise, in the exemplary embodiment, a first "clogged" indicator strip 250 which may be of a red color. A second "clean" filter indicator strip 251 is provided which may be of a green color. The positioning of these strips or color bands, may be viewed through a viewing aperture 252 having a magnifying lense 253 held therein by frame 254. Additionally, code information labels may be applied to the exterior of the housing, as indicated by the red or "clogged" indicator disc 255, intermediate indicator label (half red and half green) label 257 and "clean" indicator label (green) 258.

Figure 14:
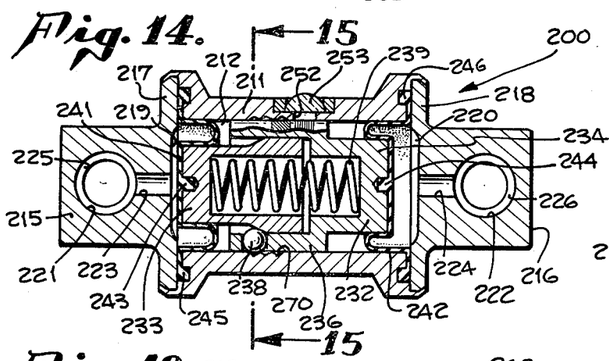
FIG. 14 is a view similar to FIG. 13 with the piston means in a "clean" condition.

As will be understood from the foregoing, when normal pressure differential conditions exist in the system, the forces upon the piston assembly of members 231 and 232 will be generally balanced into the position of FIG. 14 wherein the green "clean" color band 251 underlies the viewing lense 253. On relief of system pressures, the initial reaction of the piston assemblies, under the urging of spring 239, will be to move apart and force the friction members (balls) 38 outwardly against the surrounding housing side walls as seen in FIG. 16. On again operating the system, the piston members will be forced together, releasing the friction ball members 238, as seen in FIG. 17 and, upon an increase in the differential pressure of upstream pressure relative to downstream pressure, the assembly will be moved to the right from its position of FIG. 14 to that of FIG. 18 whereby the red "clogged" color band 250 will be positioned under the viewing lense 253. Again, this position for the indicator piston means assembly of members 231 and 232 will be maintained upon a relief of the system pressure, as when an associated internal combustion engine operating with an oil lubricating system is turned off.

Figure 19:
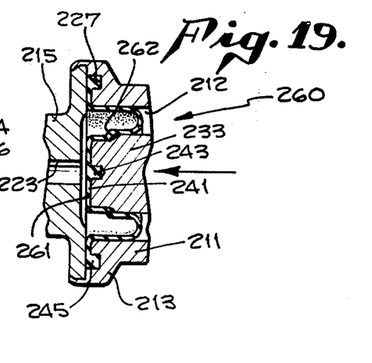
FIG. 19 is a detail view of another alternative exemplary embodiment of piston means for the filter condition indicator of the present invention.

Referring now to FIG. 19, an alternative exemplary embodiment of piston means head construction is illustrated generally at 260 in an indicator of otherwise similar construction to that just described with regard to FIGS. 12 through 18. In this alternative embodiment of piston means head construction, the piston member head is of a stepped configuration in order to present a first pressure surface 261 of a given diameter and a second annular pressure surface 262 located inwardly and extending outwardly of said first surface 261. In the condition illustrated in FIG. 19, both pressure surfaces 261 and 262 are receiving pressure from the fluid introduced through passageway 223 causing a given resultant force upon the piston member. As the pressure rises within the housing at this end, communicating with passage 223, the piston member will move to the right in an initial first stage movement. However, when the second pressure surface 262 moves out from under the diaphragm means 241, its outer end being held stationary by the entrapment of bead portion 245 in groove 227, only the primary pressure surface 261 will underlie the diaphragm causing the assembly movement to halt until a sufficient further increase in pressure causes a sufficiently greater resultant force to overcome the opposing force due to fluid pressure exerted upon opposing piston member 232. Therefore, a first increase in differential pressure may be indicated for a given first amount of increase thereof, indicating a dirty filter condition with a later or second stage position of adjustment for the assembly indicating a "clogged" condition.

While the invention has been described in detail above, it is to be understood that this detailed description is by way of example only, and that various other modifications, adaptations, and equivalent embodiments may be made thereof within the scope of the present invention which is defined by the following claims.

I claim:

1. A pressure differential indicator comprising: first and second piston means in first and second chambers, respectively,
means to subject said first and second piston means to first and second pressures respectively,
interconnecting means extending into each of said first and second chambers and connected between said first and second piston means, for requiring that the pressure force produced by said first pressure on said first piston means to enable said first piston means to move said first and second piston means together with said interconnecting means be a predetermined amount larger than the pressure force produced by said second pressure on said second piston means to enable said second piston means to move said first and second piston means together with said interconnecting means, and
kicker means provided in said first chamber for sealing off a portion of said first piston means from the pressure in said first chamber to reduce the area of said first piston means subjected to said first pressure when said first piston means is seated therein and only until said first piston means has begun to move said first and second piston means together with said interconnecting means and to thereafter no longer reduce said area, whereby said first piston means moves said first and second piston means together with said interconnecting means with a snap action.

2. The pressure differential indicator of claim 1 comprising;
second kicker means provided in said second chamber for sealing off a portion of said second means from the pressure in said second chamber to reduce the area of said second piston means subjected to said second pressure when said second piston means is seated therein only until said second piston means has begun to move said first and second piston means together with said interconnecting means and to thereafter no longer reduce said area, whereby said second piston means moves said first and second piston means together with said interconnecting means against said friction means with a snap action.

3. In a pressure differential indicator for indicating a rise in a fluid pressure differential across a filter in a fluid system when in normal operation, due only to contamination build up and wherein said indicator includes movably mounted piston means and means for communicating fluid pressures of said system upstream and downstream of said filter to first and second piston surfaces of said piston means which are in opposed force transmitting relationship, the improvement comprising the provision of:
differential means for giving said second piston surface a hydrostatic advantage over said first piston surface in said opposed force transmitting relationship for normally unbalancing the resultant forces of said pressures on said piston means in favor of that applied by said second surface to hold said piston means in a given first clean filter indicating position under varying system pressures operating with a clean filter condition, said differential means including means for causing movement of said piston means to a second caution contamination filter indicating position only when the resultant forces on said piston means are substantially balanced due to increases in the pressure drop across said filter of a given predetermined increased amount indicative of a predetermined amount of filter contamination warranting replacement of said filter and to a third dirty filter indicating position on further increases in said pressure drop, whereby said piston means is movably responsive relative said second caution position to an increase or decrease in the pressure differential across said filter due only to filter contamination above or below said predetermined increased amount of pressure differential which balances said resultant forces of said pressures on said piston means first and second surfaces, respectively, and
means for giving a visually observable indication of the position of said piston means, wherein said piston means includes two pistons, each having one of said surfaces in communication with said upstream and downstream pressures, and said differential means comprises the provision of:
interconnecting means between said pistons to provide simultaneous motion therefor and including a pivoted connecting rod extending between said pistons and wherein the lever arm of said rod from its pivot to the piston having said second surface which is exposed to downstream pressure is longer than that relative to the other piston.

4. In a pressure differential indicator for indicating a rise in a fluid pressure differential across a filter in a fluid system when in normal operation, due only to contamination build up and wherein said indicator includes movably mounted piston means and means for communicating fluid pressures of said system upstream and downstream of said filter to first and second piston surfaces of said piston means which are in opposed force transmitting relationship, the improvement comprising the provision of:
differential means for giving said second piston surface a hydrostatic advantage over said first pistion surface in said opposed force transmitting relationship for normally unbalancing the resultant forces of said pressures on said piston means in favor of that applied by said second surface to hold said piston means in a given first clean filter indicating position under varying system pressures operating with a clean filter condition, said differential means including means for causing movement of said piston means to a second caution contamination filter indicating position only when the resultant forces on said piston means are substantially balanced due to increases in the pressure drop across said filter of a given predetermined increased amount indicative of a predetermined amount of filter contamination warranting replacement of said filter and to a third dirty filter indicating position on further increases in said pressure drop, whereby said piston means is movably responsive relative said second caution position to an increase or decrease in the pressure differential across said filter due only to filter contamination above or below said predetermined increased amount of pressure differential which balances said resultant forces of said pressures on said piston means first and second surfaces, respectively;
means for giving a visually observable indication of the position of said piston means; and
means are provided for holding said movably mounted piston means in its system operating position it assumes due to said system pressures upon reduction of said pressures.

5. The improvement in pressure differential indicator of claim 4 wherein said means for holding said piston means comprises friction means interposed between said piston means and the walls of a surrounding chamber within which said piston means is operable.

6. In a pressure differential indicator for indicating a rise in a fluid pressure differential across a filter in a fluid system when in normal operation, due only to contamination build up and wherein said indicator includes moveably mounted piston means and means for communicating fluid pressures of said system upstream and downstream of said filter to first and second piston surfaces, respectively, of said piston means which are in opposed force transmitting relationship in first and second chambers the improvement comprising the provision of:
differential means for giving said second piston surface a mechanical advantage over said first piston surface in said opposed force transmitting relationship for normally unbalancing the resultant forces of said pressures on said piston means in favor of that applied by said second surface under varying system pressures operating with a clean filter condition and by an amount whereby the forces on said piston means are balanced under varying system pressures when the contamination of said filter increases the pressure drop thereacross by a given predetermined increased amount, whereby said piston means is responsive to an increase or decrease in the pressure differential across said filter due only to filter contamination above or below said predetermined increased amount of pressure differential which balances said resultant forces of said pressures on said piston means;
means for giving a visually observable indication of the movement of said piston means;
means for holding said moveably mounted piston means in its system operating position it assumes due to said system pressures upon reduction of said pressures; and
wherein said means for holding said piston means in its system operating position comprises the provision of an assembly of two separate members biased apart and means for engaging the walls of a surrounding chamber within which said piston means is positioned and which is operated to so engage said walls by the said members in their biased apart position and released when said members are subjected to said pressures.

7. The improvement in pressure differential indicator of claim 6 wherein:
spring means are provided between said two separate members for biasing them apart and thereby operating said engaging means, said spring means being selected to hold said members apart under pressure differential across said members up to those of a normal system idle running condition and being compressed to allow movement of said member toward one another when the system pressure increases above said idle condition.

8. The improvement in pressure differential indicator of claim 6 wherein a plurality of indexing grooves are provided in said chamber walls to be engaged by said means for engaging.

9. A pressure differential indicator comprising:
first and second piston means in first and second chambers respectively;
means to subject said first and second piston means to first and second pressures respectively;
interconnecting means extending into each of said first and second chambers and connected between said first and second piston means for requiring that the pressure force produced by said first pressure on said first piston means to enable said first piston means to move said first and second piston means together with said interconnecting means be a predetermined amount larger than the pressure force produced by said second pressure on said second piston means to enable said second piston means to move said first and second piston means together with said interconnecting means; and a body member of generally elongated cylindrical shape and formed with a pair of openings extending axially inwardly from the opposite ends thereof, said first and second piston means being located one each in each of said axial openings, said interconnecting means comprising an interconnecting rod secured to the inside ends of each of said first and second piston means and extending through a suitably formed opening in the wall of said body between said first and second piston mean bores, the overall length of said first and second piston means and interconnecting rod being a predetermined amount larger than the axial length of said body, whereby at least a portion of one or the other of said first and second piston means extends outwardly beyond one of the other ends of said body.

10. The pressure differential indicator of claim 9 comprising:

a protective cover member overlying the end of said body member to which said piston members extend, said cover member being formed of a transparent material.

11. A pressure differential indicator comprising:

first and second piston means, means to subject said first and second piston means to first and second pressures respectively;

a housing having cylinder means to mount said first and second piston means in a side-by-side tandem arrangement;

interconnecting means between said first and second piston means and including differential force means selectively provided to require that the pressure force produced by said first pressure on said first piston means to enable said first piston means to move said first and second piston means together with said interconnecting means be a predetermined amount larger than the pressure force produced by said second pressure on said second piston means to enable said second piston means to move said first and second piston means together with said interconnecting means, said interconnecting means comprising a cross beam having each of its ends operatively co-operable with one of said first and second piston means; and means to pivotally mount said cross beam intermediate its ends in said housing the configurations and locations of said cross beam, said piston means, and the pivot point of said cross beam in said housing being provided so that a portion of one or the other of said first and second piston means is exposed out of said housing at an one instant.

12. The pressure differential indicator of claim 11 comprising:

an adapter member and means to secure said indicator housing to said adapter member, said pressure subjecting means comprising passageways formed in said adapter member to deliver said first and second pressures to said first and second piston means respectively.

13. The pressure differential indicator of claim 12 comprising:

diaphragm means for each of said first and second piston means, said diaphragm means comprising a bead portion, means to sealingly mount said diaphragm bead portion for each of said piston means in a suitable formed groove at the interface between said indicator housing and said adapter portion, each of said diaphragm portions including an enlarged flexible diaphragm adapted to encase said first and second piston portions, and having doubled over diaphragm portions to permit motion of said piston portions towards and away from said adapter portion while retaining a fluid seal between said indicator portion and said adapter portion.

14. The pressure differential indicator of claim 11 comprising:

said piston means comprising a pair of identical piston members, each of said piston members comprising a formed opening to receive the respective end of said cross beam, said ends of said cross-beam being formed with ball ends, said pivot point of said cross beam on said body member being located a predetermined amount closer to said second piston means, whereby said first piston means is provided with a longer moment arm between said ball end and said pivot point than the moment arm between said pivot point and the ball end of said cross beam cooperable with said second piston means.

15. The pressure differential indicator of claim 11 comprising:

pressure differential indicia provided on the ends of said piston means which are exposed out of said body member.

16. The pressure differential indicator of claim 11 wherein:

said housing comprises a pair of spaced cross walls defining a groove therebetween, said crossbeam being mounted in the groove between said cross walls by a pivot pin extending through said cross walls and a suitably formed opening in said cross beam, and a spring cover member overlying said crosswalls, and adapted to hold the ends of said pivot pin and to close off said groove against the entry of foreign materials therein.

17. A pressure differential indicator comprising:

first and second piston means, means to subject said first and second piston means to first and second pressures respectively, interconnecting means between said first and second piston means, and including differential force means selectively provided to require that the pressure force produced by said first pressure on said first piston means to enable said first piston means to move said first and second piston means together with said interconnecting means be a predetermined amount larger than the pressure force produced by said second pressure on said second piston means to enable said second piston means to move said first and second piston means together with said interconnecting means, a housing means to mount said first and second piston means and said interconnecting means, in said housing; said first and second pressures comprising the upstream and downstream pressures of a filter member located in a circulating pressurized fluid system, and said means to subject said piston means to said pressures comprising adapter means interposed between said indicator housing and said filter member; wherein said filter member is of the spin-on type, said adapter means comprising an adapter member having one side for connection to the engine which simulates a normal spin-on filter, and its opposite side for connection to the filter which simulates the normal engine connection, said adapter means further comprising a ring portion surrounding said adapter member to permit rotation of said adapter member therein, and a throat portion for interconnecting said ring portion with said indicator housing and passageway means forming part of said pressure subjecting means formed in said adapter member and said throat portion to tap into the flow of lubricating oil through said adapter member to and from said filter to deliver said pressures to said indicator means, and fluid seals interposed one between said adapter means and engine and another between said adapter means and said filter.

18. A pressure differential indicator comprising:
first and second piston means,
means to subject said first and second piston means to first and second pressures respectively,
interconnecting means between said first and second piston means and including differential force means selectively provided to require that the pressure force produced by said first pressure on said first piston means to enable said first piston means to move said first and second piston means together with said interconnecting measn be a predetermined amount larger than the pressure force produced by said second pressure on said second piston means to enable said second piston means to move said first and second piston means together with said interconnecting means,
a housing means to mount said first and second piston means and said interconnecting means in said housing; said first and second pressures comprising the upstream and downstream pressures of a filter member located in a circulating pressurized fluid system, and said means to subject said piston means to said pressures comprising adapter means interposed between said indicator housing and said filter member;
said adapter means comprising an adapter body formed integral with said indicator housing, said adapter means further comprising a pair of connector members moveably and sealingly mounted on said adapter body, said pressure subjecting means comprising passageways formed in said connector to tap said indicator into the flow of fluid through said filter member via conduits inter-connecting the ends of said pair of connector members through said filter member.

19. A pressure differential indicator comprising:
first and second piston means,
means to subject said first and second piston means to first and second pressures respectively,
interconnecting means between said first and second piston means and including differential force means selectively provided to require that the pressure force produced by said first pressure on said first piston means to enable said first piston means to move said first and second piston means together with said interconnecting means be a predetermined amount larger than the pressure force produced by said second pressure on said second piston means to enable said second piston means to move said first and second piston means together with said interconnecting means, and a body of generally elongated cylindrical shape comprising a pair of bores extending inwardly towards the opposite ends thereof, said piston means comprising a pair of piston members mounted one in each of said bores, an interconnecting rod extending between said pistons through a suitably formed opening in the wall of said body between said bores and rigidly interconnecting said pistons, the overall length of said pistons and interconnecting rods being longer than the overall length of said body, said first and second pressures both being less than atmospheric pressure and said indicator being exposed to atmospheric pressure on the outside thereof, said first and second piston means each comprising a piston member of stepped construction, and retainer plates mounted in each end of said body for cooperation with the step in said piston members to define the outermost limit of motion of each of said piston members.

20. The pressure differential indicator of claim 19, wherein a larger cross-sectional area of said first piston means is provided as compared to the cross-sectional area of said second piston means, said enlargement of cross-sectional area being a predetermined amount and proportional to the predetermined desired differential pressure at the operating pressures encountered by said indicator.

21. The pressure differential indicator of claim 19 including differential pressure indicia on said first and second piston means on the portions thereof exposed out of said body in one or the other of the positions of said first and second piston means together with said interconnecting means in said body.

22. A pressure differential indicator comprising:
first and second piston means,
means to subject said first and second piston means to first and second pressures respectively,
interconnecting means between said first and second piston means and including differential force means selectively provided to require that the pressure force produced by said first pressure on said first piston means to enable said first piston means to move said first and second means together with said interconnecting means be a predetermined amount larger than the pressure force produced by said second pressure on said second piston means to enable said second piston means to move said first and second piston means together with said interconnecting means, and a body member of generally elongated cylindrical shape formed with a pair of bores extending inwardly toward the opposite ends thereof, said piston means comprising first and second piston members located one in each of said bores, a connecting rod interconnecting said piston members and extending through a suitably formed opening in the wall of said body member between the inner ends of said bores, connection means to connect the end of said connecting rod to said piston members, said connecting means comprising a plurality of resilient fingers each having an overlapping edge, and a suitably formed stepped opening in the inner ends of said piston members, whereby said ends of said connecting rod may be thrust into said openings and said fingers will first compress and then expand to lock said connecting rod to said piston members.

23. A filter contamination indicator for a fluid system including a filter and operating at various fluid pressures such that the pressure drop across the filter when the latter is clean varies in a predeterminable manner proportionate to system operating pressures, said indicator comprising:

movably mounted piston means and means for communicating fluid pressures of said system upstream and downstream of said component to first and second piston surfaces respectively;
means for mounting said first and second piston surfaces in opposed force transmitting relationship within a housing, said piston means including first and second piston portions connected to said first and second surfaces respectively and in telescoping relation to each other,
means for providing said second piston surface a mechanical advantage over said first piston surface whereby the force exerted on said second piston surface is larger than that on said first piston surface under their respective changing pressures during system operation with a clean filter, the forces of said piston surfaces are balanced at a predetermined value of increased pressure drop across said filter due to contamination build up and the force on said first surface exceeds that on said second surface when pressure drop across said filter due to contamination build up exceeds said predetermined value;
means for biasing said telescoping piston portions away from each other; and
means operated on movement of said piston portions away from each other under said bias when system pressure is relieved for holding said moveably mounted piston means in the position it assumed under the action of said system pressures.

* * * * *